United States Patent
Gao

(10) Patent No.: US 11,385,885 B2
(45) Date of Patent: Jul. 12, 2022

(54) SYSTEM AND METHOD OF DOWNLOADING A FIRMWARE TO A SERVER

(71) Applicant: LENOVO ENTERPRISE SOLUTIONS (SINGAPORE) PTE. LTD., Singapore (SG)

(72) Inventor: Zhipeng Gao, Wuxi (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 407 days.

(21) Appl. No.: 16/520,984

(22) Filed: Jul. 24, 2019

(65) Prior Publication Data

US 2020/0050460 A1    Feb. 13, 2020

(30) Foreign Application Priority Data

Aug. 7, 2018  (CN) .......................... 201810890013.9

(51) Int. Cl.
| | |
|---|---|
| *G06F 8/65* | (2018.01) |
| *G06F 9/4401* | (2018.01) |
| *G06F 13/42* | (2006.01) |
| *G06F 8/60* | (2018.01) |

(52) U.S. Cl.
CPC .................. *G06F 8/65* (2013.01); *G06F 8/60* (2013.01); *G06F 9/4401* (2013.01); *G06F 9/4408* (2013.01); *G06F 13/4282* (2013.01); *G06F 2213/0042* (2013.01)

(58) Field of Classification Search
CPC ..... G06F 8/60; G06F 8/63; G06F 8/65; G06F 9/4401; G06F 9/4408; G06F 13/4282; G06F 2213/0042
See application file for complete search history.

(56) References Cited

U.S. PATENT DOCUMENTS

| | | | |
|---|---|---|---|
| 10,331,434 B2* | 6/2019 | Tung | G06F 8/654 |
| 2007/0169088 A1* | 7/2007 | Lambert | G06F 11/0793 |
| | | | 717/168 |
| 2013/0007430 A1* | 1/2013 | Fan | G06F 9/445 |
| | | | 713/1 |
| 2013/0173952 A1* | 7/2013 | Gao | G06F 9/4406 |
| | | | 714/E11.112 |
| 2015/0186150 A1* | 7/2015 | Chung | G06F 9/4411 |
| | | | 711/103 |
| 2016/0179648 A1* | 6/2016 | Srivastava | G06F 13/4295 |
| | | | 710/16 |
| 2016/0283221 A1* | 9/2016 | Kochar | G06F 9/45558 |
| 2017/0052854 A1* | 2/2017 | Yang | G06F 11/1417 |
| 2017/0322816 A1* | 11/2017 | Parthiban | G06F 9/4416 |
| 2018/0088962 A1* | 3/2018 | Balakrishnan | G06F 11/1417 |
| 2018/0246830 A1* | 8/2018 | Zhu | G06F 13/364 |
| 2019/0045654 A1* | 2/2019 | Abbondanzio | H05K 7/1498 |
| 2020/0379743 A1* | 12/2020 | Wang | G06F 13/4282 |

* cited by examiner

*Primary Examiner* — Glenn A. Auve

(57) ABSTRACT

A method of downloading a firmware to a server is disclosed as including providing a server with a mainboard with a baseboard management controller (BMC) and at least one universal serial bus (USB) port, connecting the USB port to a USB device controller of the BMC of the server, resetting the BMC, connecting a data processing device with the server via the USB port, and downloading a firmware to the BMC from or through the data processing device via the USB port.

15 Claims, 6 Drawing Sheets

SYSTEM AND METHOD OF DOWNLOADING A FIRMWARE TO A SERVER

TECHNICAL FIELD

This invention relates to system and method of downloading a firmware to a server via a smart phone and a USB port of the server.

BACKGROUND OF THE INVENTION

A mainboard of a server includes a baseboard management controller (BMC) which provides fundamental services of server management. It is thus imperative to prevent corruption of the BMC and to provide recovery solutions in case of corruption. In one existing recovery solution, a separate Uboot/Kernel provided with a file system is saved in a separate "almost RO" chip, e.g. a NOR flash. The Uboot/Kernel reads the recovery image from a trivial file transfer protocol (TFTP) server or flash disk. The drawbacks of such an arrangement include (a) a separate chip is required to save the recovery image for recovery purpose; (b) a serial debug cable is usually required to be attached for the operations, and (c) the security concern over the use of flash disks. One other possible recovery solution includes saving two copies of the BMC images in two chips, with one of the two chips being reserved for recovery purpose only. If all bootable images are corrupted, then replacement of the mainboard is the only choice.

It is thus an object of the present invention to provide a server and a method in which the aforesaid shortcomings are mitigated or at least to provide a useful alternative to the trade and public.

SUMMARY OF THE INVENTION

According to a first aspect of the present invention, there is provided a server including a mainboard with a baseboard management controller (BMC) having a universal serial bus (USB) device controller; at least one USB port; and an integrated circuit (IC) device, wherein the IC device is operable to connect said USB port to said USB device controller of said BMC.

According to a second aspect of the present invention, there is provided a method including connecting a universal serial bus (USB) port of a server to a USB device controller of a baseboard management controller (BMC) of the server; resetting said BMC; connecting a data processing device with said server via said USB port; and downloading a firmware to said BMC from or through said data processing device via said USB port.

BRIEF DESCRIPTION OF THE DRAWINGS

Embodiments of the present invention will now be described, by way of example only, with reference to the accompanying drawings, in which.

DETAILED DESCRIPTION OF THE EMBODIMENTS

Figure 1:
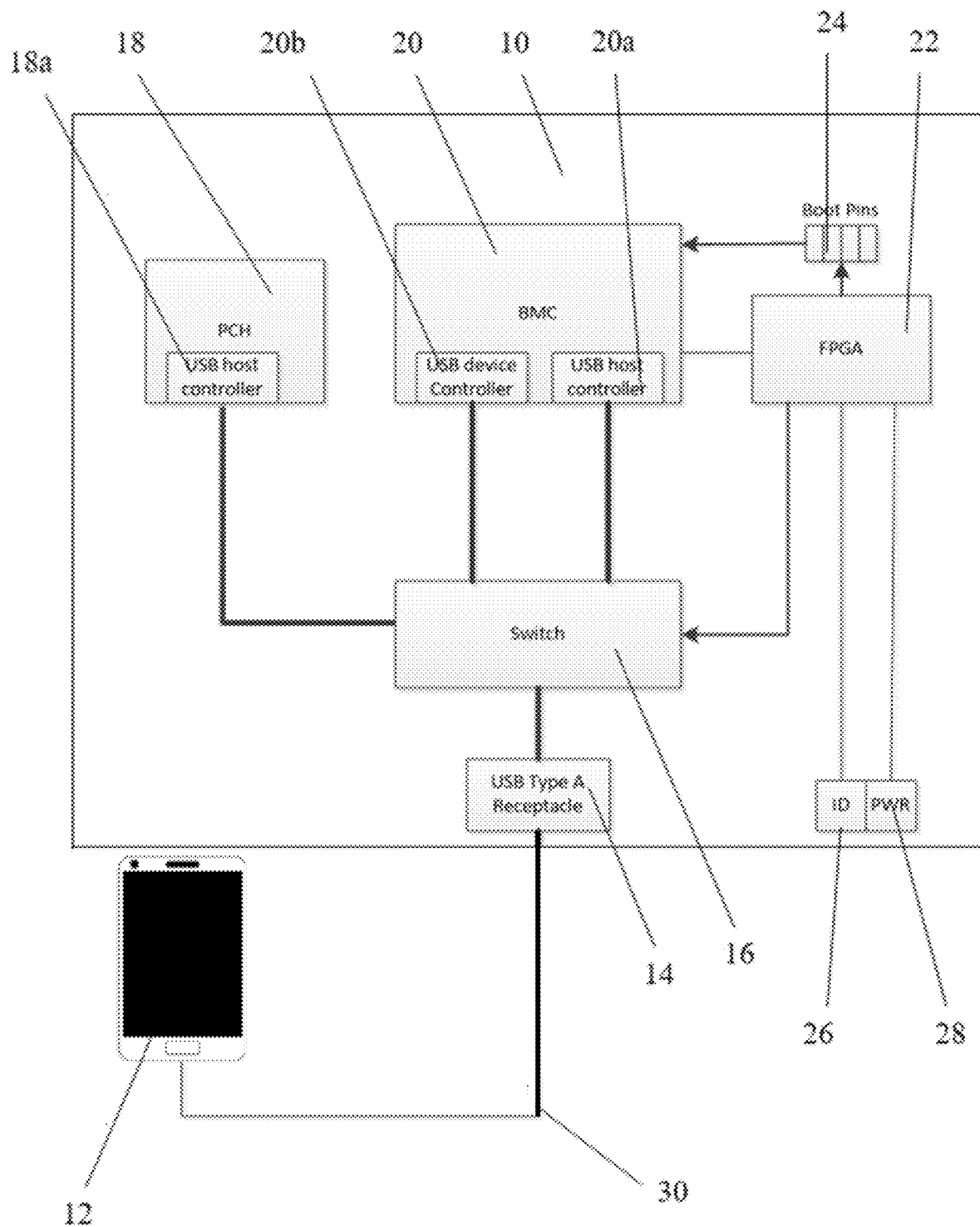
FIG. 1 shows a schematic view of an arrangement for downloading a firmware to a server via a smart phone and a USB port of the server.

A schematic view of an example system for downloading a firmware to a server 10 via a smart phone 12 and a USB port 14 of the server 10 is shown in FIG. 1. The smart phone 12 is with Internet connectivity, and the USB port 14 may be a USB Type A receptacle. The smart phone 12 is connected via a standard USB On-The-Go (OTG) cable 30 with the USB port 14. The USB port 14 is selectively connectable via a switch 16 to:
  (a) a USB host controller 18a of a platform controller hub (PCH) 18,
  (b) a USB host controller 20a of a baseboard management controller (BMC) 20,
  (c) a USB device controller 20b of the BMC 20, and
  (d) an integrated circuit (IC) device, in the form of a field-programmable gate array (FPGA) 22.

The FPGA 22 is connected with boot pins 24 of the server 10, and with an identity (ID) button 26 and a power (PWR) button 28 of the server 10.

Normally, the USB port 14 is assigned to the server host, and connected with the USB host controller 18a of the PCH 18. The BMC 20 may load a boot image from a NAND or NOR flash; the PWR button 28 is operable to power on/off the server 10 and the ID button 26 is a button with light-emitting diode (LED) indication.

For carrying out the firmware recovery process according to a first method, the ID button 26 and the PWR button 28 are pressed at the same time, whereby instructions are sent to the FPGA 22, which activates the switch 16 to disconnect the USB port 14 from the USB host controller 18a of the PCH 18 and to connect the USB port 14 instead with the USB device controller 20b of the BMC 20. The FPGA 22 then changes the values of the boot pins 24 to enable BMC boot from the USB device port 14, and finally resets the BMC 20.

Figure 2A:
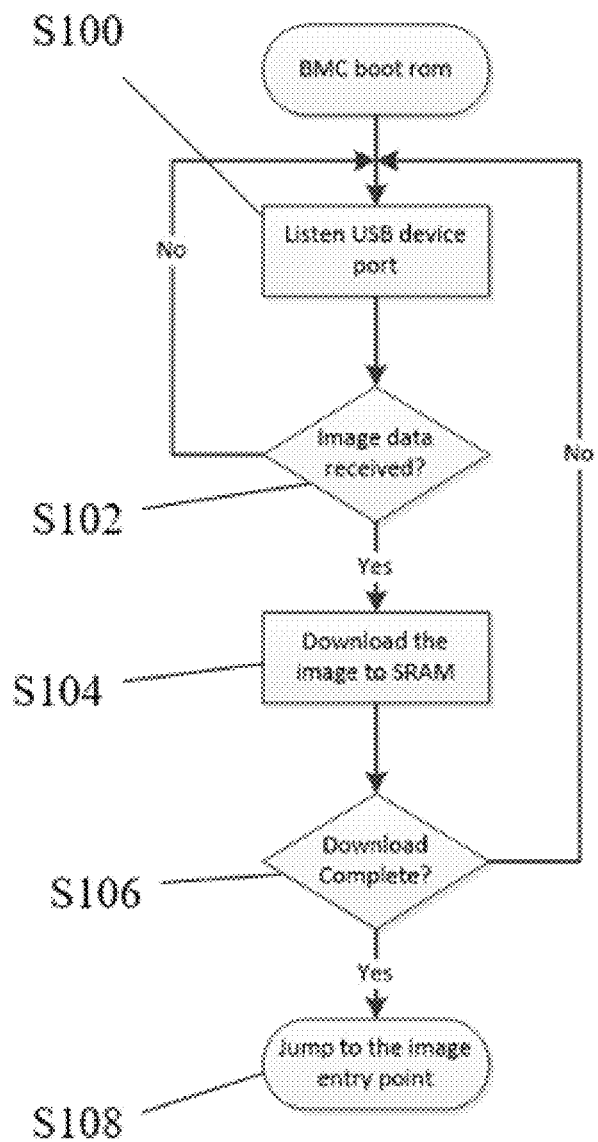
FIGS. 2A, 2B and 2C show steps of a first method of downloading a firmware to a server via a smart phone and a USB port of the server.
Figure 2B:
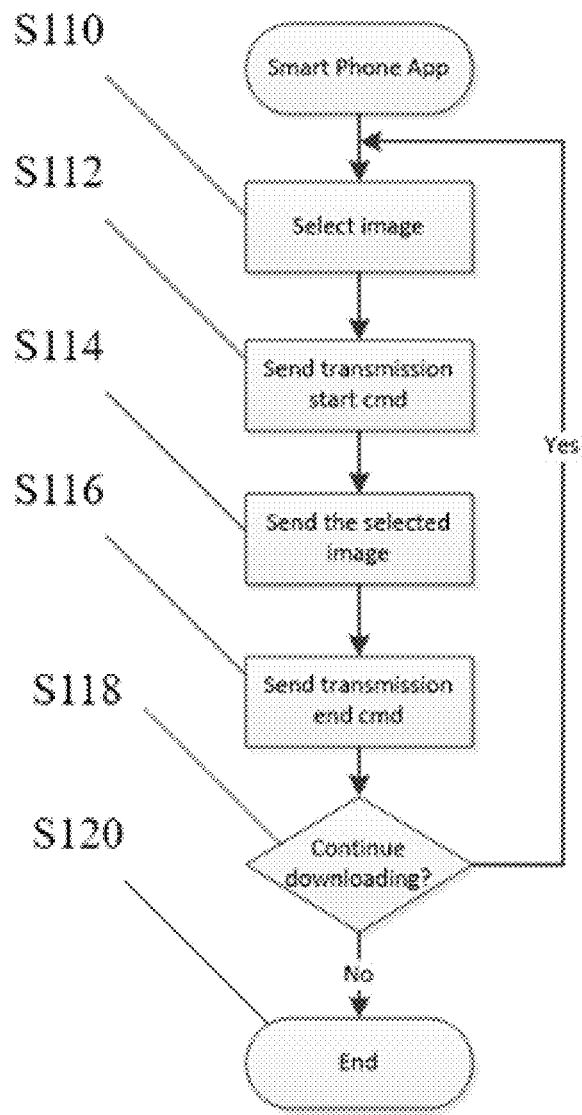
Figure 2C:
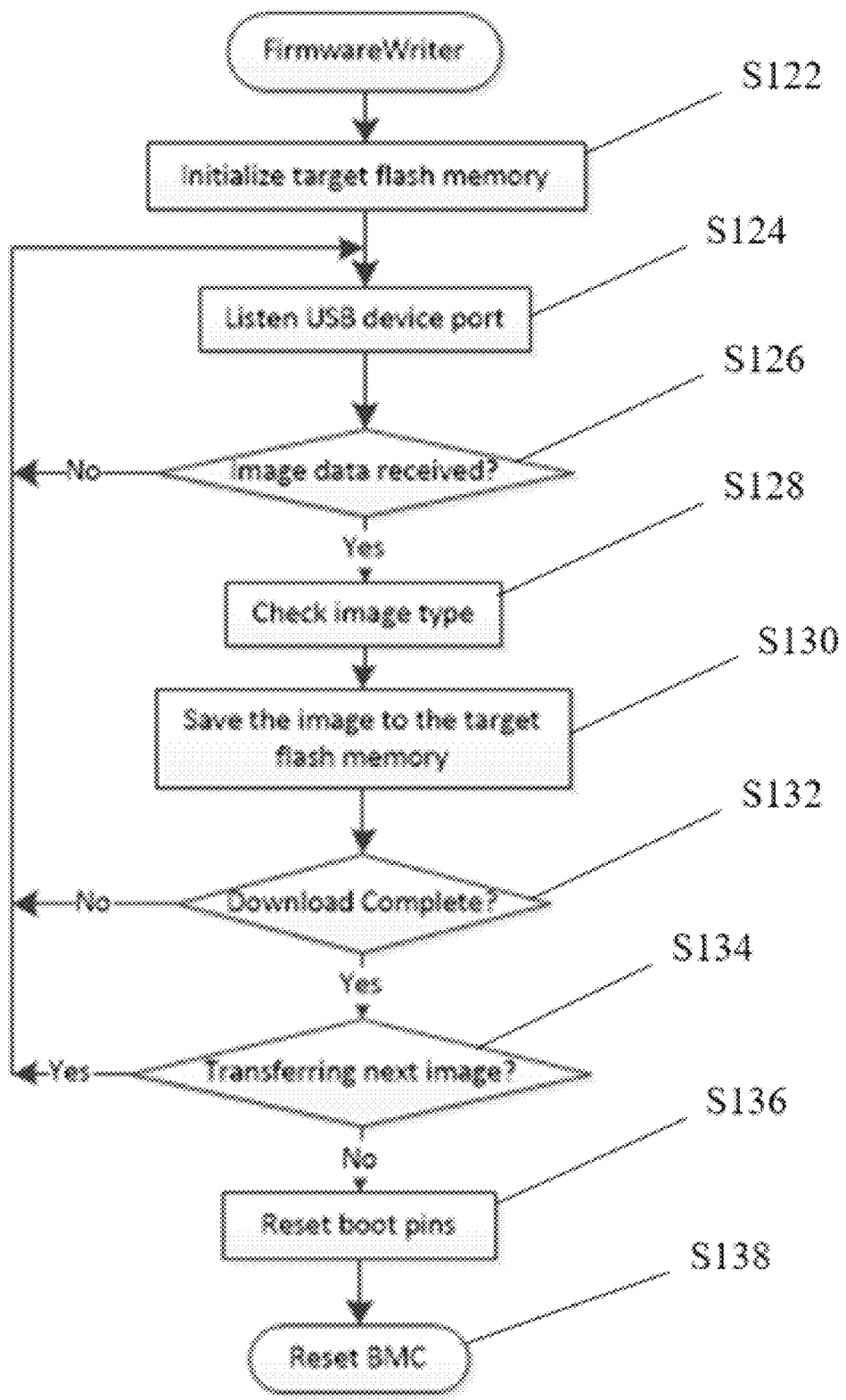

Turning then to FIGS. 2A to 2C, the BMC boot ROM listens to the USB device port 14 (S100). The smart phone 12 is connected via a standard USB On-The-Go (OTG) cable 30 with the USB port 14. The smart phone 12 has installed application software (Apps) which is able to send commands to the USB device controller 20b of the BMC 20. If the image data of the firmware are received (S102) from or through the smart phone 12, the image data are downloaded to the SRAM (S104) of the BMC 20. It should be noted that regardless of the number of firmware images to be downloaded, a FirmwareWriter application software may be downloaded first. It should also be appreciated that, in addition to the SRAM of the BMC 20, the image data of the firmware may be downloaded to other storage locations. The BMC 20 then checks whether the download is complete (S106), and if not, the BMC boot ROM continues to listen to the USB device port 14 (S100). If, on the other hand, the download is complete (S106), the BMC boot ROM jumps to the entry image entry point (S108).

The smart phone Apps selects the appropriate firmware image (S110), sends a transmission start command (S112), sends the selected firmware image (S114), and then sends a transmission end command (S116). If the download is to be continued (S118), the Apps starts a new firmware image (S110). If the download is not to be continued (S118), the smart phone Apps ends the operation (S120).

The FirmwareWriter application software initializes a target flash memory (S122) and listens to the USB device port 14 (S124). If image data are received (S126), it checks the image type (S128) and saves the image (e.g. firmware copy) to the target flash memory (S130). It then checks whether the download is complete (S132). If not, it again listens to the USB device port 14 (S124) for the reception of image data (S126). If the download is complete (S132), it will check if a next image is to be transferred (S134). If so, it again listens to the USB device port 14 (S124) for the reception of image data (S126). If no further image is to be transferred (S134), it will reset the boot pins 24 (S136), and then reset the BMC 20 (S138).

Figure 3A:
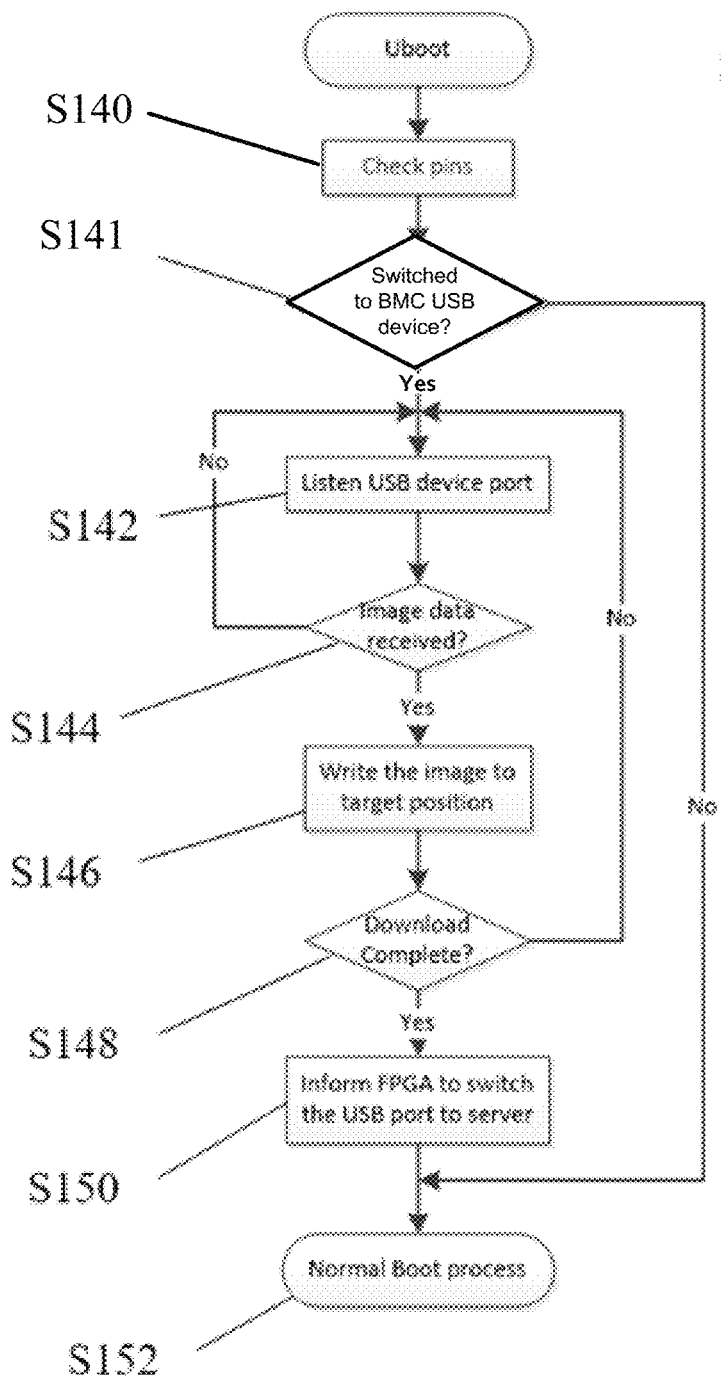
FIGS. 3A and 3B show steps of a second method of downloading a firmware to a server via a smart phone and a USB port of the server.
Figure 3B:
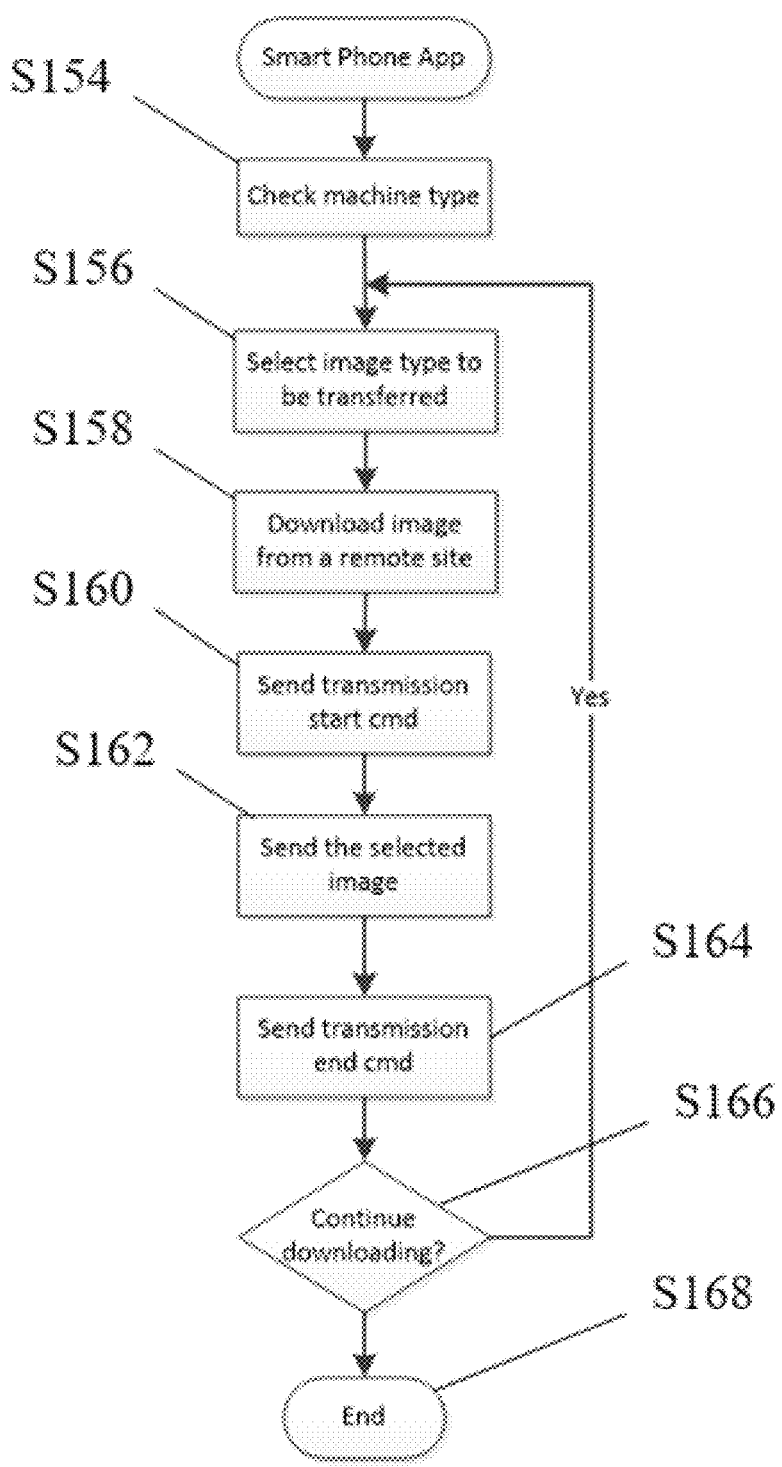

If the BMC CPU does not support booting from USB device port 14, and as shown in FIGS. 3A and 3B, the FPGA 22 disconnects the USB port 14 from the USB host controller 18a of the PCH 18 and connects the USB port 14 instead with the USB device controller 20b of the BMC 20, and reboots the BMC 20.

The Uboot checks the boot pins (S140) to determine whether the USB device port 14 has been switched to the USB device controller 20b of the BMC 20 (S141). The Uboot then listens to the USB device port 14 (S142) to check if any image data (e.g. of a firmware) are received (S144) from a smart phone 12. If image data are received from a smart phone 12, the image data are written to the target position (S146). The Uboot then checks if the download is complete (S148). If not, it will continue to listen to the USB device port 14 (S142). If the download is complete (S148), it will inform the FPGA 22 to switch the USB port 14 back to the PCH 18 of the server 10 (S150), and then the normal boot process will continue (S152).

The smart phone 12 is installed with a smart phone application software (Apps). The Apps checks the machine type of the server 10 (S154), and then selects the appropriate image type to be transferred (S156) from the network or Internet location to which it is connected. The Apps then downloads the image from a remote site (S158), such as an trusted website. It then sends a transmission start command (S160), sends the selected firmware image (S162), and then sends a transmission end command (S164). It will then check if the download is to continue (S166). If so, the Apps again selects the appropriate image type to be transferred (S156) from the trusted website to which it is connected. If, on the other hand, no further downloading is required, the Apps will end operation (S168).

The following are advantages of the present invention:

a. recovery and updating server firmware is simplified and cost is reduced;

b. trusted firmware images may be downloaded from trusted websites of the original manufacturers of the BMC;

c. server firmware may be recovered from scratch; and d. no separate flash chip are required for saving the Uboot/Kernel.

It should be understood that the above only illustrates examples whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. A server including:
a mainboard with a baseboard management controller (BMC) having a universal serial bus (USB) device controller;
at least one USB port; and
an integrated circuit (IC) device,
wherein the IC device is operable to connect the USB port to the USB device controller of the BMC, and wherein the IC device is operable to enable the BMC to boot from the USB port.

2. The server according to claim 1, wherein the IC device is operable to switch the USB port from being connected with a USB host controller of the BMC to being connected with the USB device controller of the BMC.

3. The server according to claim 1, wherein the IC device is operable to change boot pin values to enable the BMC to boot from the USB port.

4. The server according to claim 1, further including at least two buttons which can be actuated simultaneously to instruct the IC device to connect the USB port to the USB device controller of the BMC.

5. The server according to claim 4, wherein the at least two buttons include an "ID" button and a "POWER" button.

6. The server according to claim 1, wherein the IC device is a field programmable gate array (FPGA).

7. A method including:
connecting a universal serial bus (USB) port of a server to a USB device controller of a baseboard management controller (BMC) of the server;
resetting the said BMC;
connecting a data processing device with the server via the USB port; and
downloading a firmware to the BMC through the data processing device via the USB port, including enabling the BMC to boot from the USB port of the server.

8. The method according to claim 7, further comprising connecting, via an integrated circuit (IC) device of the server, the USB port to the USB device controller of the BMC of the server.

9. The method according to claim 8, wherein connecting, via the IC device of the server, the USB port to the USB device controller of the BMC of the server comprises switching, by the IC device, the USB port from being connected with a USB host controller of the BMC to being connected with the USB device controller of the BMC of the server.

10. The method according to claim 8, further including pressing at least two buttons of the server simultaneously to instruct the IC device to connect the USB port to the USB device controller of the BMC of the server.

11. The method according to claim 10, wherein the two buttons include an "ID" button and a "POWER" button.

12. The method according to claim 7, further including changing boot pin values to enable BMC boot from the USB port of the server.

13. The method according to claim 12, wherein a field-programmable gate array (FPGA) of the server changes boot pin values to enable BMC boot from the USB port of the server.

14. The method according to claim 7, wherein the data processing device is connected with the USB port via an USB On-The-Go (OTG) cable.

15. The method according to claim 7, wherein the data processing device includes a smart phone with Internet connection capability.

* * * * *